United States Patent
Foye et al.

(10) Patent No.: US 8,365,544 B2
(45) Date of Patent: Feb. 5, 2013

(54) SCREW COMPRESSOR DRIVE CONTROL

(75) Inventors: David M. Foye, La Crosse, WI (US); Nathan T. West, Holmen, WI (US); Dennis M. Beekman, La Crosse, WI (US); John R. Sauls, La Crosse, WI (US)

(73) Assignee: Trane International Inc., Piscataway, NJ (US)

( * ) Notice: Subject to any disclaimer, the term of this patent is extended or adjusted under 35 U.S.C. 154(b) by 762 days.

(21) Appl. No.: 12/544,582

(22) Filed: Aug. 20, 2009

(65) Prior Publication Data

US 2011/0041533 A1 Feb. 24, 2011

(51) Int. Cl.
 *F25B 1/00* (2006.01)
 *F04B 49/00* (2006.01)
(52) U.S. Cl. .................. 62/228.1; 417/19; 417/44.1
(58) Field of Classification Search ............. 62/228.1, 62/498, 230; 417/44.1, 19, 45, 53, 15, 213, 417/326
See application file for complete search history.

(56) References Cited

U.S. PATENT DOCUMENTS

| | | | |
|---|---|---|---|
| 5,067,560 A | 11/1991 | Carey et al. | |
| 5,832,737 A | 11/1998 | Moilanen | |
| 5,979,168 A | 11/1999 | Beekman | |
| 6,116,046 A | 9/2000 | Leaver et al. | |
| 6,606,872 B1 | 8/2003 | Smith | |
| 7,387,498 B2 * | 6/2008 | Schnetzka et al. | 417/4 |
| 2006/0272343 A1 * | 12/2006 | Takahashi et al. | 62/230 |
| 2007/0180841 A1 * | 8/2007 | Bae et al. | 62/228.1 |
| 2008/0292470 A1 * | 11/2008 | Sawada et al. | 417/15 |

FOREIGN PATENT DOCUMENTS

| | | | |
|---|---|---|---|
| JP | 2006017041 A | * | 1/2006 |
| JP | 2006223097 A | * | 8/2006 |

* cited by examiner

*Primary Examiner* — Chen Wen Jiang
(74) *Attorney, Agent, or Firm* — McAndrews, Held & Malloy Ltd.

(57) ABSTRACT

An embodiment of method used to control operation of a screw compressor of a refrigeration system may include receiving status signals regarding operation of the screw compressor of the refrigeration system. The method may further include determining an operating point of the screw compressor based upon the received status signals, and selecting a torque profile for the screw compressor based upon the operating point. The method may also include driving the screw compressor per the selected torque profile. Refrigeration systems and compressor systems suitable for implementing the method are also presented.

20 Claims, 3 Drawing Sheets

SCREW COMPRESSOR DRIVE CONTROL

BACKGROUND OF THE INVENTION

Compressors in refrigeration systems raise the pressure of a refrigerant from an evaporator pressure to a condenser pressure. The evaporator pressure is sometimes referred to as the suction pressure and the condenser pressure is sometimes referred to as the discharge pressure. At the discharge pressure, the refrigerant is capable of cooling a desired medium. Many types of compressors, including rotary screw compressors, are used in such refrigeration systems.

A screw compressor includes a suction port and a discharge port that open into a working chamber of the screw compressor. The working chamber includes a pair of meshed screw rotors that define a compression pocket between the screw rotors and interior walls of the working chamber. Refrigerant is received by the suction port and delivered to the compression pocket. Rotation of the rotors closes the compression pocket from the suction port and decreases the volume of the compression pocket as the rotors move the refrigerant toward the discharge port. Due to decreasing the volume of the compression pocket, the rotors deliver the refrigerant to the discharge port at an discharge pressure that is greater than the suction pressure.

BRIEF SUMMARY OF THE INVENTION

Embodiments of refrigeration systems, compressor systems and methods to control screw compressors of such systems are disclosed. An embodiment of a method of controlling operation of a screw compressor of a refrigeration system may include receiving status signals regarding operation of the screw compressor of the refrigeration system. The method may further include determining an operating point of the screw compressor based upon the received status signals, and selecting a torque profile for the screw compressor based upon the operating point. The method may also include driving the screw compressor per the selected torque profile. Embodiments of refrigeration systems, compressor systems suitable for implementing disclosed embodiments of controlling operation of a screw compressor are also presented.

Those skilled in the art will appreciate advantages and superior features of the above embodiments, together with other important aspects thereof upon reading the detailed description which follows in conjunction with the drawings.

BRIEF DESCRIPTION OF SEVERAL VIEWS OF THE DRAWINGS

Embodiments are described herein by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE INVENTION

The following description describes refrigeration systems, compressor systems and techniques to control compressors of such systems. In the following description, numerous specific details are set forth in order to provide a more thorough understanding of the described systems and techniques. However, one skilled in the art readily appreciates that the various embodiments of the described systems and techniques may be practiced without such specific details. In other instances, specific aspects of the described systems and techniques have not been shown or described in detail in order not to obscure other aspects of the described systems and techniques.

References in the specification to "one embodiment", "an embodiment", "an example embodiment", etc., indicate that the described embodiment may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, other embodiments may incorporate or otherwise implement such feature, structure, or characteristic whether or not explicitly described.

Some aspects of the described systems and techniques may be implemented in hardware, firmware, software, or any combination thereof. Some aspects of the described systems may also be implemented as instructions stored on a machine readable medium which may be read and executed by one or more processors. A machine readable medium may include any storage device to which information may be stored in a form readable by a machine (e.g., a computing device). For example, a machine readable medium may include read only memory (ROM); random access memory (RAM); magnetic disk storage media; optical storage media; flash memory devices; and others.

Figure 1:
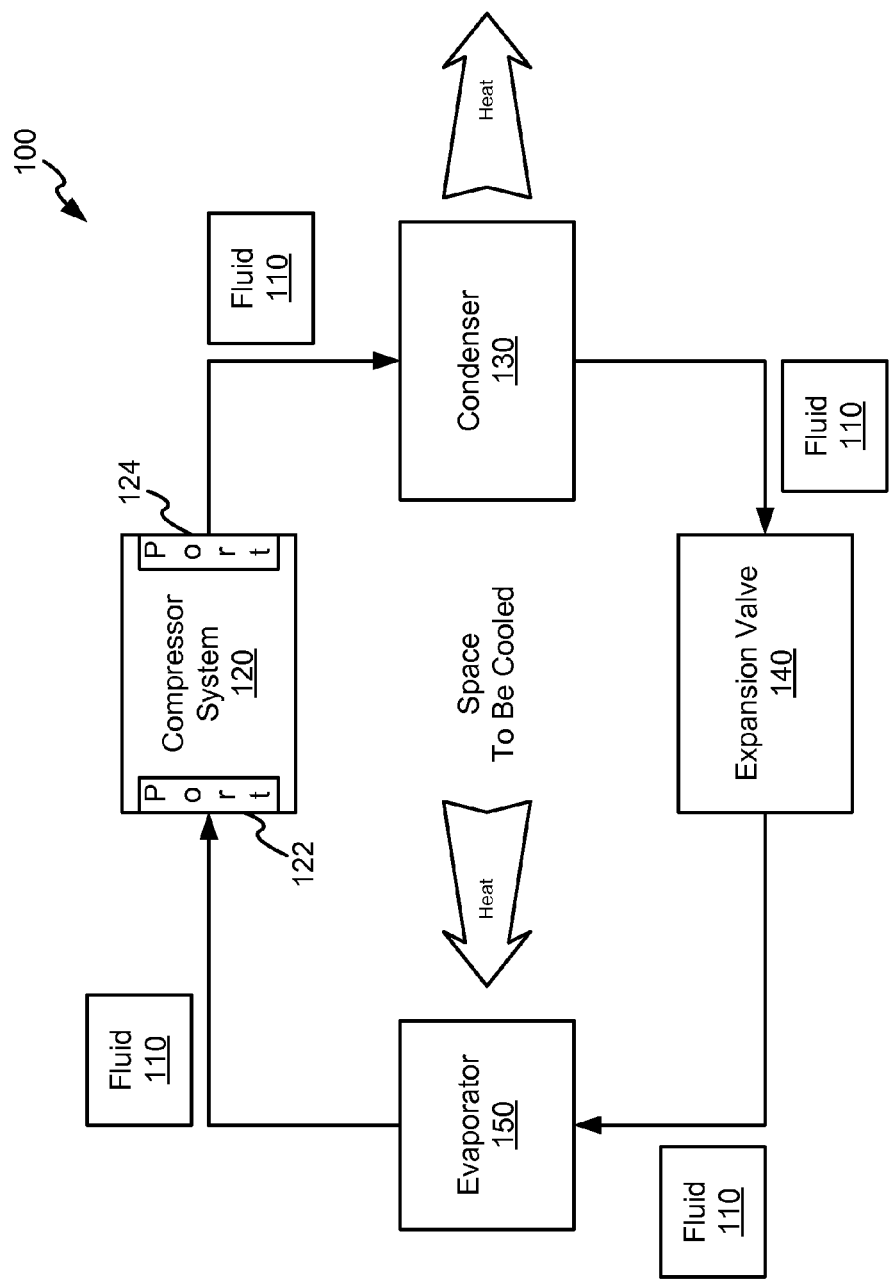
FIG. 1 shows an embodiment of a refrigeration system comprising a compressor system.

Referring now to FIG. 1, an embodiment of a refrigeration system 100 is depicted. The refrigeration system 100 may circulate a fluid 110 such as, for example, a liquid refrigerant in order to cool a space such as a room, home, or building. The circulated fluid 110 may absorb and remove heat from the space to be cooled and may subsequently reject the heat elsewhere. As shown, the refrigeration system 100 may include a compressor system 120, a condenser 130 coupled to the condenser system 120, an expansion valve 140 coupled to the condenser 130, and an evaporator 150 coupled between the compressor system 120 and the expansion valve 140.

The compressor system 120 may include a suction port 122 and a discharge port 124. The suction port 122 of the compressor system 120 may receive the fluid 110 in a thermodynamic state known as a saturated vapor. The compressor system 120 may compress the fluid 110 as the compressor system 120 transfers the fluid 110 from the suction port 122 to the discharge port 124. In particular, the suction port 122 may receive the fluid 110 at a suction pressure and suction temperature. The compressor system 120 may compress the fluid 110 and may discharge the compressed fluid 110 via the discharge port 124 at a discharge pressure that is higher than the suction pressure. Compressing the fluid 110 may also result in the fluid 110 being discharged at a discharge temperature that is higher than the suction temperature. The fluid 110 discharged from the discharge port 124 may be in a thermodynamic state known as a superheated vapor. Accordingly, the fluid 110 discharged from the compressor system 120 may be at a temperature and pressure at which the fluid 110 may be readily condensed with cooling air or cooling liquid.

The condenser 130 may be coupled to the discharge port 124 of the compressor system 120 to receive the fluid 110. The condenser 130 may cool the fluid 110 as the fluid 110 passes through the condenser 130 and may transform the fluid 110 from a superheated vapor to a saturated liquid. To this end, the condenser 130 may include coils or tubes through which the fluid 110 passes and across which cool air or cool liquid flows. As a result of the cool air or cool liquid passing across the coils of the condenser 130, the fluid 110 may reject or otherwise deliver heat from the refrigeration system 100 to the air or liquid which in turn carries the heat away.

The expansion valve 140 may receive the fluid 110 from the condenser 130 in a thermodynamic state known as a saturated liquid. The expansion valve 140 may abruptly reduce the pressure of the fluid 110. The abrupt pressure reduction may cause adiabatic flash evaporation of at least a portion of the fluid 110 which may lower the temperature of the fluid 110. In particular, the adiabatic flash evaporation may result in a liquid and vapor mixture of the fluid 110 that has a temperature that is colder than the temperature of the space to be cooled.

The evaporator 150 may receive the cold fluid 110 from the expansion valve 140 and may route the cold fluid 110 through coils or tubes of the evaporator 150. Warm air or liquid may be circulated from the space to be cooled across the coils or tubes of the evaporator 150. The warm air or liquid passing across the coils or tubes of the evaporator 150 may cause a liquid portion of the cold fluid 110 to evaporate. At the same time, the warm air or liquid passed across the coils or tubes may be cooled by the fluid 110, thus lowering the temperature of the space to be cooled. The evaporator 150 may deliver the fluid 110 to the suction port 122 of the compressor system 120 as a saturated vapor. Thus, the evaporator 150 may complete the refrigeration cycle and may return the fluid 110 to the compressor system 120 to be recirculated again through the compressor system 120, condenser 130, and expansion valve 140. Therefore, in the refrigeration system 100, the evaporator 150 may absorb and remove heat from the space to be cooled, and the condenser 130 may subsequently reject the absorbed heat to air or liquid that carries the heat away from the space to be cooled.

Figure 2:
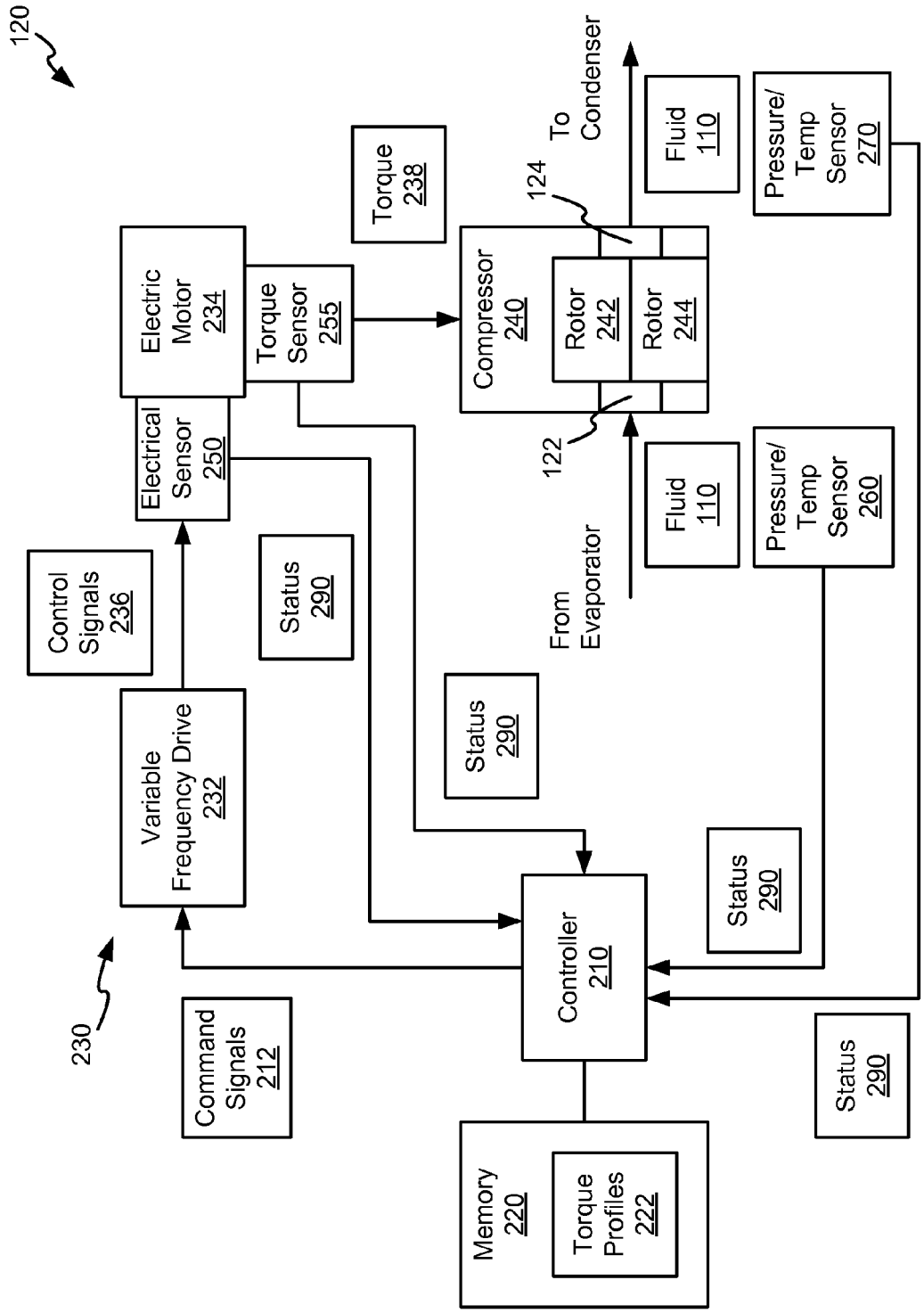
FIG. 2 shows additional details of the compressor system of FIG. 1.

Referring now to FIG. 2, further details regarding an embodiment of the compressor system 120 are presented. In particular, the compressor system 120 as shown may include a controller 210, memory 220, an electric motor system 230, and a screw compressor 240. The compressor system 120 may further include one or more electrical sensors 250, torque sensors 255, suction pressure and/or temperature sensors 260, and discharge pressure and/or temperature sensors 270. The sensors 250, 255, 260, 270 provide status signals 290 with measurements that are indicative of the operation of the screw compressor 240.

The controller 210 may include processors, microcontrollers, analog circuitry, digital circuitry, firmware, and/or software that cooperate to control operation of the screw compressor 240. The memory 220 may comprise non-volatile memory devices such as flash memory devices, read only memory (ROM) devices, electrically erasable/programmable ROM devices, and/or battery backed random access memory (RAM) devices to store an array of torque profiles 222 for the screw compressor 240 in a persistent manner. The memory 220 may further include instructions which the controller 210 may execute in order to control the operation of the screw compressor 240.

As explained in more detail below, the controller 210 may receive status signals 290 from one or more sensors 250, 255, 260, 270 of the compressor system 120 that provide information regarding operation of the screw compressor 240. Based upon the status signals 290, the controller 210 may determine an operating mode and/or operating point of the screw compressor 240 and may generate, based upon the determined operating mode and/or operating point, one or more command signals 212 to adjust the operation of the screw compressor 240. In particular, the controller 210 in one embodiment may select a torque profile 222 from the array of torque profiles 222 or may otherwise determine a torque profile 222 for the screw compressor 240 based upon the operating mode and/or operating point determined from the status signals 290. The controller 210 may then generate command signals 212 that request the electric motor system 230 to deliver torque 238 to the screw compressor 240 per the torque profile 222 obtained for the screw compressor 240.

The electric motor system 230 may drive the screw compressor 240 in response to command signals 212 received from the controller 210. In particular, the electric motor system 230 may include a variable frequency drive 232 and an electric motor 234. The electric motor 234 may be coupled to the screw compressor 240 to drive meshed screw rotors 242, 244 of the screw compressor 240. In one embodiment, the electric motor 234 may include a permanent magnetic motor that drives the rotors 242, 244 at a speed that is dependent upon the frequency of polyphase control signals 236 and at a torque 238 that is dependent upon the electric current supplied by the polyphase control signals 236. As shown, the variable frequency drive 232 may receive command signals 212 from the controller 210 and may generate the polyphase phase control signals 236. In particular, the variable frequency drive 232 may adjust the frequency and electric current of the polyphase control signals 236 based upon the command signals 212 received from the controller 210. As mentioned above, the controller 210 may generate the command signals 212 per a torque profile 222 selected for the screw compressor 240. As such, the variable frequency drive 232 in response to the command signals 212 adjusts the frequency and current of the control signals 236 per the torque profile 222 selected for the screw compressor 240.

As shown, the electrical sensor 250 may be positioned proximate the electric motor 234 to sense electrical operating characteristics of the electric motor 234. The electrical sensor 250 may further provide status signals 290 with measurements that are indicative of the sensed electrical operating characteristics. In one embodiment, the electrical sensor 250 may include one or more current sensors. The current sensors may be positioned to sense the electric current supplied by the control signals 236 to the electric motor 234 and may generate status signals 290 that are indicative of the sensed electric current. In one embodiment, the torque 238 produced by the electric motor 234 is dependent upon the electric current supplied by the control signals 236. Accordingly, status signals 290 indicative of the electric current supplied to the electric motor 234 may also be indicative of the torque 238 supplied by the electric motor 234. While the electrical sensor 250 in one embodiment comprises current sensors that sense current supplied to the electric motor 234, the electrical sensor 250 may sense other electrical operating characteristics of the electric motor 234 such as voltages, currents, phase angles, effective impedances at the input and/or other parts of the electric motor 234 and provide status signals 290 indicative of the sensed electrical operating characteristics.

As shown, the torque sensor 255 may be positioned proximate the electric motor system 230 to sense torque 238 applied by the electric motor system 230 to the screw compressor 240. The torque sensor 255 may further provide status signals 290 with measurements that are indicative of the sensed torque 238. In one embodiment, the torque sensor 255 may include one or more torsion elements positioned between the electric motor 234 and the compressor 240. The torque sensor 255 may then generate status signals 290 indicative of the torque 238 sensed by and/or applied to the torsion elements.

The screw compressor 240 may further include the suction port 122 and the discharge port 124 of the compressor system 120. As shown, the suction pressure and/or temperature sensor 260 may be positioned proximate the suction port 122 of the screw compressor 240 to sense pressure and/or temperature of the fluid 110 entering the suction port 122. Likewise, the discharge pressure and/or temperature sensor 270 may be positioned proximate the discharge port 124 of the screw compressor 240 to sense pressure and/or temperature of the fluid 110 discharged from the discharge port 124. Moreover, the suction pressure and/or temperature sensor 260 may provide status signals 290 with measurements that are indicative of the sensed pressure and/or temperature of the fluid 110 entering the suction port 122, and the discharge pressure and/or temperature sensor 270 may provide status signals 290 with measurements that are indicative of the sensed pressure and/or temperature of the fluid 110 discharged from the discharge port 124.

The screw compressor 240 may further include a plurality of meshed screw rotors 242, 244. The plurality of meshed screw rotors 242, 244 may define one or more compression pockets between the screw rotors 242, 244 and interior chamber walls of the screw compressor 240. Torque 238 supplied by the electric motor 234 may rotate the screw rotors 242, 244, thus closing the compression pocket from the suction port 122. Rotation of the screw rotors 242, 244 further decreases the volume of the compression pocket as the rotors 242, 244 move the fluid 110 toward the discharge port 124. Due to decreasing the volume of the compression pocket, the screw rotors 242, 244 deliver the fluid 110 to the discharge port 124 at an discharge pressure that is greater than the suction pressure and at a discharge temperature that is greater than the suction temperature.

The operation of the screw compressor 240 in compressing and moving the fluid 110 produces axial and radial forces. The interaction of the screw rotors 242, 244, the axial forces, and the radial forces may result in time varying and non-uniform rotor movements and forces against chamber walls, bearings, and end surfaces of the screw compressor 240. Lubricating oil provides cushioning films for the chamber walls, rotors 242, 244, and bearings of the screw compressor 240, but does not prevent the transmission of the time varying and non-uniform axial and radial forces. In selecting a torque profile 222 for the screw compressor 240, the controller 210 attempts to select a torque profile 222 that drives the screw compressor 240 in a manner which reduces the non-productive radial and axial forces.

Different screw compressor designs generally exhibit some unique operating characteristics and some common operating characteristics. A generally common operating characteristic of many screw compressor designs is that many screw compressor designs exhibit pulsating torque that is coincident with suction, compression, and discharge phases of the screw compressor. Other generally commonly operating characteristics include dynamic transmission of force from a male screw rotor to a meshed female screw rotor, and axial thrust of the screw rotors 242, 244.

Due to the unique operating characteristics of different screw compressor designs, experimental determinations may be made of various torque profiles 222 to identify beneficial torque profiles 222 for the screw compressor design in different operating modes and/or at operating points in such operating modes. In particular, the screw compressor 222 may be operated at different speeds, average motor currents, discharge pressures and/or temperatures, suction pressures and/or temperatures, and/or other operating parameters to obtain beneficial torque profiles 222 for the screw compressor 240 in various operating modes and/or operating points. For example, the screw compressor 240 may be operated in a start mode to obtain a starting torque profile 222, in an acceleration mode to obtain an acceleration torque profile 222, and in a deceleration mode to obtain a deceleration profile 222.

Based upon such experimentation, an array of torque profiles 222 for associated operating modes and/or operating points may be established for the screw compressor 240. In one embodiment, each torque profile of the array of torque profiles 222 comprises a pattern of the electric motor to compressor shaft torque values occurring during one or several motor revolutions. The pattern may be repetitive and may be defined over more than one complete motor revolution as one revolution of the motor may not equate to one revolution of the compressor driven rotors 242, 244. The length of the torque profile 222 may be defined as an integer number of revolutions which make the torque profile pattern repeat in sequence. The controller 210 may repetitively select and/or apply a torque profile 222 to achieve a desired control result.

Furthermore, in order to maintain a desired level of stability, the array of torque profiles 222 may be structured and torque profiles 222 may be selected by the controller 210 in manner that effects a stable control function of the screw compressor 240. In particular, the array of torque profiles 222 may be constructed to limit the rate at which the torque 238 is changed in order to maintain stability of the control function. In one embodiment, stability may be maintained by populating the array of torque profiles 222 with torque profiles 222 that maintain approximately equal rates of change. This may be accomplished by experimental determination of operating conditions of the screw compressor 240 at unequal operating point differences, and maintaining the torque profile differences in the array of torque profiles 222 to approximately equal values.

In one embodiment, the torque profiles 222 may be constructed to represent the torque control values directly as sampled points versus time. In another embodiment, the torque profiles 222 may be constructed to represent torque control values as integer harmonic multiples of a primary operating frequency of the screw compressor 240. In particular, the harmonics defining the torque profiles 222 may be expressed in terms of harmonic frequency amplitude and phase.

Figure 3:
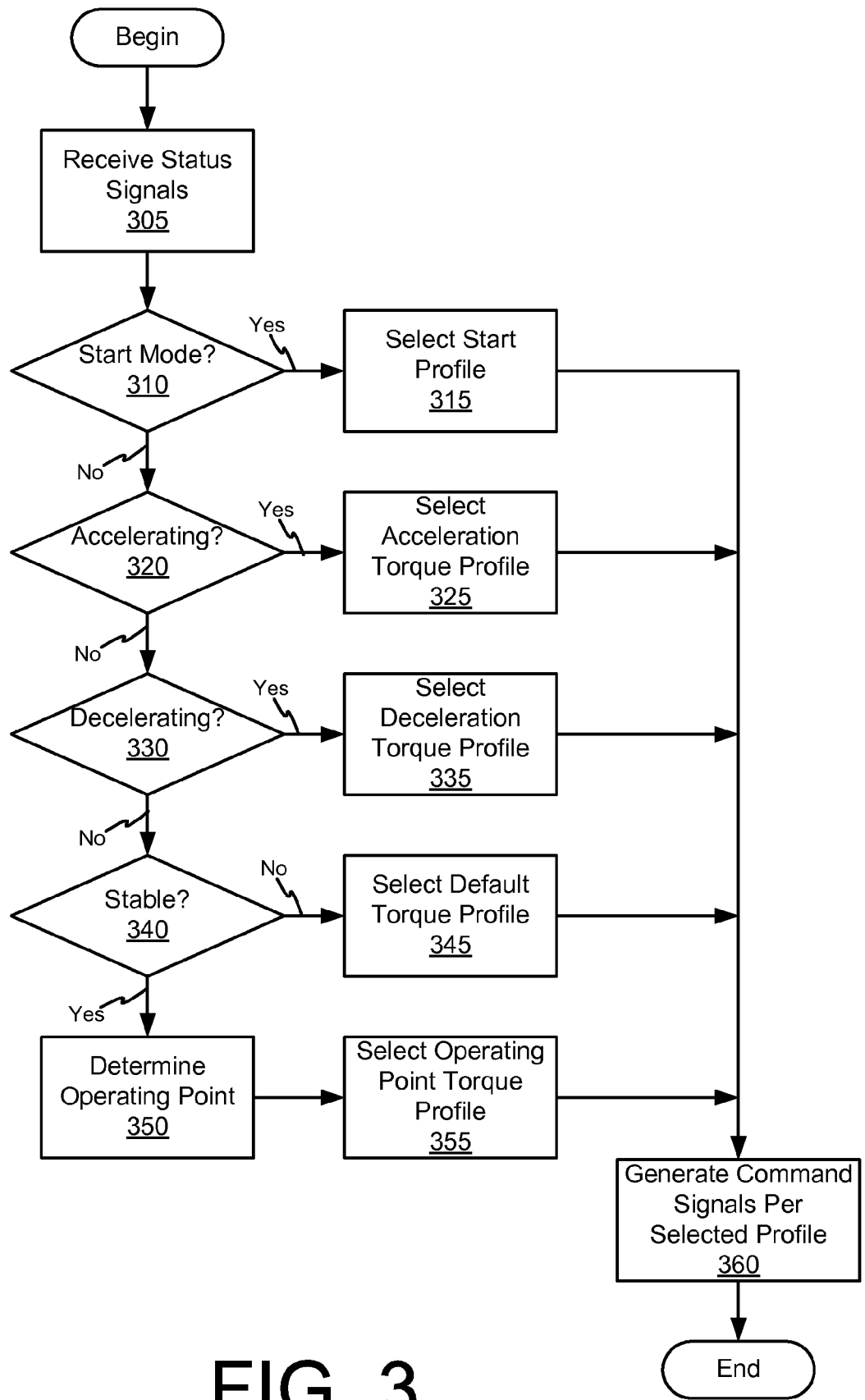
FIG. 3 shows a flowchart of a control method implemented by the compressor system of FIG. 1.

Referring now to FIG. 3, an embodiment of a control method that may be implemented by the controller 210 is shown. The controller 210 in one embodiment periodically executes the control method of FIG. 3 in order to adjust the torque profile 222 used to drive the screw compressor 240. At block 305, the controller 210 may receive status signals 290 from various sensors 250, 255, 260, 270 of the compressors system 120 that provide information regarding the present operation of the screw compressor 240. The controller 210 at block 310 may determine whether the screw compressor 240 is in a start mode. The controller 210 may determine whether the screw compressor 240 is in a start mode based upon data supplied by the status signals 290. The controller 210 may also determine whether the screw compressor 240 is in a start mode based upon other data of the refrigeration system 100. For example, the controller 210 may determine that the screw compressor 240 is in a start mode in response to a signal from a control panel or thermostat (not shown) that indicates the controller 210 is to turn on the refrigeration system 100 and start the screw compressor 240. In response to determining that the screw compressor 240 is in a start mode, the controller 210 may select a start torque profile 222 from the memory 220 at block 315.

In response to determining that the screw compressor 240 is not in a start mode, the controller 210 at block 320 may determine whether the screw compressor 240 is accelerating. In particular, the controller 210 based upon the status signals 290 may determine whether the rotation speed of the meshed rotors 242, 244 is increasing. In one embodiment, the controller 210 determines whether the screw compressor 240 is accelerating based upon several sampled points of the status signals 290 as well as an acceleration threshold level to ensure that minor fluctuations in the rotation speed of the meshed rotors 242, 244 during periods of stable or steady operation are not mistakenly interpreted as an acceleration of the rotors 242, 244. In response to determining that the screw compressor 240 is accelerating, the controller 210 may select an acceleration torque profile 222 from the memory 220 at block 325.

In response to determining that the screw compressor 240 is not accelerating, the controller 210 at block 330 may determine whether the screw compressor 240 is decelerating. In particular, the controller 210 based upon the status signals 290 may determine whether the rotation speed of the meshed rotors 242, 244 is decreasing. In one embodiment, the controller 210 determines whether the screw compressor 240 is decelerating based upon several sampled points of the status signals 290 as well as a deceleration threshold level to ensure that minor fluctuations in the rotation speed of the meshed rotors 242, 244 during periods of stable or steady operation are not mistakenly interpreted as a deceleration of the rotors 242, 244. In response to determining that the screw compressor 240 is decelerating, the controller 210 may select a deceleration torque profile 222 from the memory 220 at block 335.

In response to determining that the screw compressor 240 is not decelerating, the controller 210 at block 340 may verify that the operation of the screw compressor 240 is relatively stable or steady. During operation of the refrigeration system 100, the screw compressor 240 may experience periods of relatively stable or steady operation in which the rotation speed of the rotors 242, 244 is relatively constant, the suction pressure and/or temperature is relatively constant, and the discharge pressure and/or temperature is relatively constant. Accordingly, the controller 210 at block 340 may determine based upon the status signals 290 whether the screw compressor 240 is operating at a relatively stable or steady operating point. Similar to the above acceleration and deceleration determinations, the controller 210 may determine whether the screw compressor 240 is operating at a relatively stable or steady point based upon several sampled points of the status signals 290 as well as various threshold levels to ensure that minor fluctuations in the rotation speed, the suction pressure and/or temperature, and/or the discharge pressure and/or temperature do not result in a mistaken determination that the screw compressor 240 is not operating at a relatively stable or steady operating point. In response to determining that operation of the screw compressor 240 is not relatively stable or steady, the controller 210 may select at 345 a default torque profile 222 for the screw compressor 240 that results in the electric motor system 230 providing suitable torque 238 to the screw compressor 240 during periods not associated with starting, accelerating, decelerating, and/or stable operation.

In response to determining that operation of the screw compressor 240 is relatively stable, the controller 210 at block 350 may determine an operating point of the screw compressor 240 based upon the status signals 290. As mentioned above, the array of torque profiles 222 includes torque profiles 222 for the screw compressor 240 at various operating speeds, suction pressures and/or temperatures, and discharge pressures and/or temperatures. Thus, the controller 210 at block 355 may select, based upon the status signals 290, a torque profile 222 from the memory 220 that corresponds to the operating speed, suction pressure and/or temperature, and discharge pressure and/or temperature indicated by the status signals 290. In other embodiments, the controller 210 may select a plurality of torque profiles 222 from the memory 220 that are near the operating point indicated by the status signals 290 and may generate through interpolation from the selected torque profiles 222 a torque profile 222 for the screw compressor 240 operating at the indicated operating point.

At block 360, the controller 210 may generate command signals 212 that request the electric motor system 230 to supply torque 238 to the screw compressor 240 per the torque profile 222 selected for the screw compressor 240. As mentioned above, the screw compressor 240 generally exhibits pulsing torque due to the rotors 242, 244 receiving, compressing, and discharging fluid 110. The torque profiles 222 in one embodiment may be constructed to match the pulsing torque exhibited by the screw compressor 240. Accordingly, when switching from one torque profile 222 to another torque profile 222, the switch ideally is timed to coincide with the torque pulsations. To achieve such synchronization, the controller 210 generates the command signals 212 such that the electric motor system 230 effects the switch in torque profiles 222 in synchronization with the pulsing torque of the screw compressor 240. In other embodiments, synchronization may be achieved using other techniques. For example, the electric motor system 230 may sense the torque pulsations and switch the torque profiles 222 at an appropriate time.

Many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A compressor system comprising
    a screw compressor comprising a suction port to receive fluid at a suction pressure, a plurality of meshing screw rotors to compress the fluid, and a discharge port to discharge the compressed fluid at a discharge pressure that is higher than the suction pressure;
    an electric motor to receive control signals and to drive the plurality of meshing screw rotors at a speed per the received control signals;
    a controller to receive status signals indicative of an operating point of the screw compressor, to select a torque profile for the screw compressor based upon the operating point of the screw compressor, and to generate command signals that requests the electric motor be driven per the selected torque profile; and
    a variable frequency drive to receive the command signals and to generate the control signals that vary torque between the electric motor and the screw compressor per the selected torque profile, wherein the selected torque profile represents variance in torque between the electric motor and the screw compressor during a revolution of the electric motor.

2. The compressor system of claim 1, further comprising a memory comprising a plurality of torque profiles, wherein the controller is to select the torque profile from the plurality of torque profiles based upon the operating point indicated by the status signals.

3. The compressor system of claim 1, further comprising a memory comprising a plurality of torque profiles, wherein the controller is to identify the operating point of the screw compressor based upon the status signals, and is to select the torque profile from the plurality of torque profiles based upon the identified operating point.

4. The compressor system of claim 1, further comprising a memory comprising a plurality of torque profiles, wherein in response to the status signals indicating the screw compressor has achieved a relatively stable operating point, the controller is to select a torque profile for the screw compressor based upon the plurality of torque profiles and the relatively stable operating point indicated by the status signals.

5. The compressor system of claim 1, further comprising a memory comprising a starting torque profile, an acceleration torque profile, a deceleration torque profile, a default torque profile, and a plurality of operating torque profiles, wherein the controller is to select the torque profile from the starting torque profile, the acceleration torque profile, the deceleration torque profile, the default torque profile, and the plurality of operating point torque profiles based upon the status signals.

6. The compressor system of claim 1, wherein
the control signals comprise polyphase alternating current control signals,
the electric motor comprises a permanent magnet motor to drive the screw compressor at a drive speed controlled by the polyphase alternating current control signals, and
the variable frequency drive adjusts a frequency of the polyphase alternating current control signals to adjust the drive speed of the permanent magnet motor per the command signals of the controller and the selected torque profile.

7. The compressor system of claim 1, further comprising
a suction port sensor proximate the suction port of the screw compressor to provide the status signals with suction port measurements of fluid entering the suction port of the screw compressor,
a discharge port sensor proximate the discharge port of the screw compressor to provide the status signals with discharge port measurements of fluid discharged from the discharge port of the screw compressor, and
a torque sensor to provide the status signals with torque measurements of torque applied by the electric motor to the screw compressor,
wherein the controller is to determine the operating point of the screw compressor based upon at least the suction port measurements, the discharge port measurements, and the torque measurements of the status signals.

8. The compressor system of claim 1, further comprising
a suction port sensor proximate the suction port of the screw compressor to provide the status signals with suction port measurements of fluid entering the suction port of the screw compressor,
a discharge port sensor proximate the discharge port of the screw compressor to provide the status signals with discharge port measurements of fluid discharged from the discharge port of the screw compressor, and
one or more electrical sensors positioned proximate the electric motor to sense electrical operating characteristics of the electric motor and to provide status signals indicative of the sensed electrical operating characteristics,
wherein the controller is to determine the operating point of the screw compressor based upon at least the suction port measurements, the discharge port measurements, and the electric current measurements.

9. A method to control operation of a screw compressor of a refrigeration system, comprising receiving status signals regarding operation of the screw compressor of the refrigeration system;
determining an operating point of the screw compressor based upon the received status signals;
selecting a torque profile for the screw compressor based upon the operating point, wherein the selected torque profile represents variance in torque applied to the screw compressor during a revolution of the plurality of the plurality of meshing screw rotors; and
adjusting torque applied to the screw compressor per the selected torque profile.

10. The method of claim 9, further comprising
selecting a starting torque profile for the screw compressor in response to determining that the screw compressor is in a start mode; and
driving the screw compressor per the starting torque profile.

11. The method of claim 9, further comprising
selecting an acceleration torque profile for the screw compressor in response to a increasing speed of the screw compressor; and
driving the screw compressor per the selected acceleration torque profile.

12. The method of claim 9, further comprising
selecting a deceleration torque profile for the screw compressor in response to a decreasing speed of the screw compressor; and
driving the screw compressor per the selected deceleration torque profile.

13. The method of claim 9, further comprising
selecting a default torque profile in response to determining based upon the status signal that the screw compressor is not currently operating at a steady operating point, and
driving the screw compressor per the selected default torque profile.

14. The method of claim 9, further comprising selecting the torque profile in response to determining based upon the status signals that the screw compressor is currently operating at a relatively stable operating point.

15. The method of claim 9, further comprising selecting the torque profile in response to measurements provided by the status signals achieving a predetermined level of stability.

16. A refrigeration system, comprising
a screw compressor comprising a suction port to receive fluid at a suction pressure, a plurality of meshing screw rotors to compress the fluid, and a discharge port to discharge the compressed fluid at a discharge pressure that is higher than the suction pressure;
a condenser coupled to the discharge port of the screw compressor, the condenser to cool and condense fluid received from the discharge port;
an expansion valve coupled to the condenser, the expansion valve to evaporate at least a portion of fluid received from the condenser by lowering pressure of fluid received from the condenser;
an evaporator coupled to the expansion valve, the evaporator to evaporate fluid received from the expansion valve and to provide fluid to the suction port of the screw compressor;
an electric motor system to receive command signals and to drive the plurality of meshing screw rotors per the received command signals; and
a controller to receive status signals indicative of an operating point of the screw compressor, to select a torque profile for the screw compressor based upon the operating point of the screw compressor, and to generate command signals that requests the electric motor system to vary torque between the electric motor system and the screw compressor per the selected torque profile, wherein the selected torque profile represents variance in torque between the electric motor system and the screw compressor during a revolution of the electric motor system.

17. The refrigeration system of claim 16, further comprising
a suction port sensor to provide the status signals with suction port measurements of fluid entering the suction port of the screw compressor;
a discharge port sensor to provide the status signals with discharge port measurements of fluid discharged from the discharge port of the screw compressor, and
a torque sensor to provide the status signals with torque measurements of torque applied by the electric motor system to the screw compressor,
wherein the controller is to determine the operating point of the screw compressor based upon at least the suction port measurements, the discharge port measurements, and the torque measurements of the status signals.

18. The refrigeration system of claim 16, wherein
the electric motor system comprises a variable frequency drive and a permanent magnet motor,
the permanent magnet motor is to receive polyphase variable frequency control signals and is to drive the plurality of meshing screw rotors per the received polyphase variable frequency control signals;
the variable frequency drive is to receive the command signals and is to generate the polyphase variable frequency control signals to drive the permanent magnet motor per the selected torque profile.

19. The refrigeration system of claims 18, further comprising
a suction port sensor to provide the status signals with suction port measurements of fluid entering the suction port of the screw compressor;
a discharge port sensor to provide the status signals with discharge port measurements of fluid discharged from the discharge port of the screw compressor; and
one or more electrical sensors to sense electric current supplied by the polyphase variable frequency control signals and to provide the status signals with electric current measurements of the polyphase variable frequency control signals,
wherein the controller is to determine the operating point of the screw compressor based upon at least the suction port measurements, the discharge port measurements, and the electric current measurements.

20. The refrigeration system of claim 18, further comprising a memory comprising a plurality of torque profiles, wherein the controller is to identify the operating point of the screw compressor based upon the status signals, and is to select the torque profile from the plurality of torque profiles based upon the identified operating point.

* * * * *